United States Patent [19]

Scrabis et al.

[11] Patent Number: 4,723,611

[45] Date of Patent: Feb. 9, 1988

[54] MAINTENANCE SCREW DRILL/CONVEYOR TOOL AND METHOD FOR MAINTENANCE OF ICE BEDS OF ICE CONDENSER CONTAINMENT

[75] Inventors: Charles M. Scrabis, Pittsburgh; Roy T. Hardin, Jr., Unity Township, Westmoreland County, both of Pa.

[73] Assignee: Westinghouse Electric Corp., Pittsburgh, Pa.

[21] Appl. No.: 920,644

[22] Filed: Oct. 20, 1986

Related U.S. Application Data

[62] Division of Ser. No. 827,114, Feb. 7, 1986, Pat. No. 4,671,920.

[51] Int. Cl.$^4$ .................. G21C 9/00; G21C 13/00; F25C 5/04
[52] U.S. Cl. ........................ 175/18; 175/203; 175/209; 408/56; 62/344; 376/260; 376/284
[58] Field of Search .............. 376/260, 284; 175/18, 175/203, 209, 162; 198/671; 62/137, 344, 320; 414/146; 408/9, 11, 56, 59, 200, 226

[56] References Cited

U.S. PATENT DOCUMENTS

| | | | |
|---|---|---|---|
| 2,723,835 | 11/1955 | Reese et al. | 175/18 |
| 3,430,456 | 3/1969 | Stricker | 175/18 |
| 3,502,543 | 3/1970 | Sewell | 175/162 |
| 3,850,002 | 11/1974 | Field | 376/284 |
| 3,879,958 | 4/1975 | Field | 376/284 |
| 4,048,353 | 9/1977 | Stewart et al. | 408/59 |
| 4,650,011 | 3/1987 | Barbieri | 175/18 |
| 4,671,920 | 6/1987 | Scrabis et al. | 376/284 |

Primary Examiner—Deborah L. Kyle
Assistant Examiner—Daniel Wasil
Attorney, Agent, or Firm—D. C. Abeles

[57] ABSTRACT

A tool for maintaining ice baskets associated with a nuclear reactor system. The frame of the tool includes a platform which is disposed on a lattice support structure surrounding a selected and isolated basket. The tool includes an electric drill mounted for vertical reciprocation, in parallel axial relationship with the ice basket, and plural, selectively connectable auger shaft sections having a continuous helical fin thereabout which are connected in succession between the drill and a rotary drill bit, for drilling a hole of the required length, down through the ice within the ice basket. The drill then is maintained at an upper, vertically fixed position and a funnel positioned about the auger; ice chips or flakes are fed into the funnel while the drill is driven in reverse rotation, the auger conveying the ice to the bottom of the ice basket for filling lowermost voids and for filling successively higher voids as the auger is withdrawn. Clamping means are provided for clamping the protruding end of an auger section, during both the assembly of a successive auger section thereto and the disassembly of a successive auger section therefrom.

11 Claims, 7 Drawing Figures

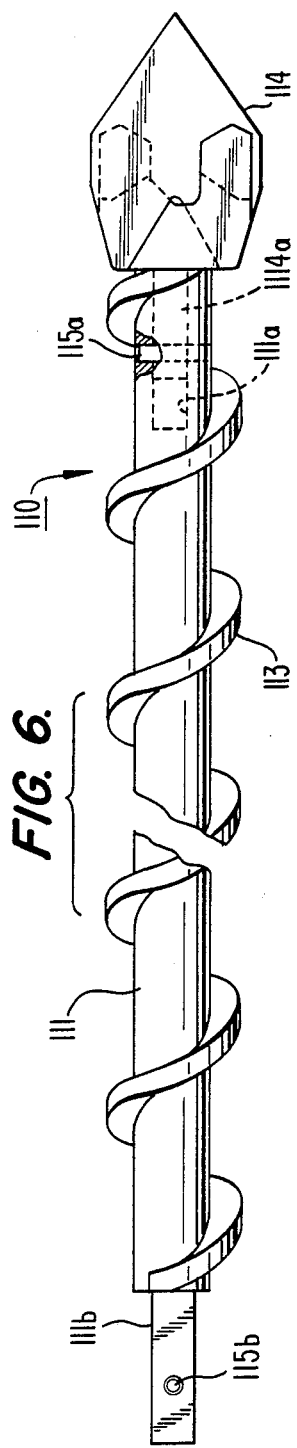
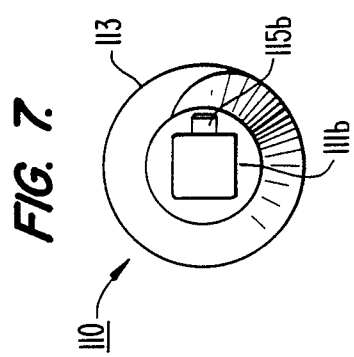
FIG. 6.
FIG. 7.

MAINTENANCE SCREW DRILL/CONVEYOR TOOL AND METHOD FOR MAINTENANCE OF ICE BEDS OF ICE CONDENSER CONTAINMENT

This is a division of application Ser. No. 06/827,114 filed Feb. 7, 1986, now U.S Pat. No. 4,671,920.

BACKGROUND OF THE INVENTION

1. Field of the Invention

This invention relates to ice condenser containments, also known as ice baskets, employed for condensing steam generated from the primary water of a nuclear reactor in the event of an accidental loss of coolant and, more particularly, to a maintenance screw drill/conveyor tool and method for maintenance of ice beds of ice condenser containments, for filling sublimated ice voids within each of the plurality of ice baskets, without having first to remove any of the existing charges of ice within the baskets.

2. State of the Relevant Art

Ice condenser containments, also known as ice baskets, are employed with nuclear reactors for condensing the steam from the primary water of the reactor in the event of an accidental loss of coolant. In a typical installation, there are provided approximately 2,000 ice baskets, each of which is approximately one foot in diameter and 48 feet in height and is filled with approximately 1,500 pounds of ice. The sidewalls of the ice basket, substantially cylindrical in configuration, are perforated to permit rapid exposure of the steam to the ice and corresponding, rapid cooling.

Each such ice basket incorporates, at spaced intervals therein, stiffening rings comprising structural elements which provide lateral rigidity and support, to accommodate not only the weight of ice contained therein but also seismic and other disturbances. Conventional ice baskets furthermore include elements known as cruciforms, comprising generally x-shaped metal straps which extend diametrically across the interior of the basket and are welded at the ends of the straps to the interior sidewalls of the basket, typically at or adjacent the stiffening rings. Typically, the cruciforms are formed of $\frac{1}{8}$ inch thick metal, and are 1-$\frac{1}{2}$ inches in height. Further, typically, seven (7) such cruciforms are assembled within the basket, spaced at approximately six (6) foot vertical intervals. While not structural members of the baskets and thus not necessary to add radial stiffness to the ice basket cross-section, the cruciforms are necessary elements for satisfying various requirements of the ice bed within the basket. For example, cruciforms are necessary to assure that the geometry of the ice bed within the basket is contained during the entire meltout period of a postulated loss of coolant accident. Specifically, as the ice melts upwardly and away from the bottom of the ice baskets, ice contained therein at higher elevations cannot be permitted to fall down into the bottoms of the baskets, since this presents the potential of creating bypass flow routes for the emerging steam which would accompany the loss of coolant. The cruciforms also serve to prevent large masses of ice from falling during seismic disturbances; falling masses of ice could impose unacceptable impact loads on the ice basket and related, underlying supporting structure.

The presence of the cruciforms, however, compounds a maintenance problem which exists in the operation of nuclear power systems employing such ice condenser containments. Particularly, due to sublimation of the ice, the initial volume and weight thereof decreases with time and thus the ice must be replenished, or replaced. Typically, a minimum of at least 1,200 pounds of ice is required for each ice basket, for assuring its effectiveness for counteracting the accidental loss of coolant, as above referenced. The cruciforms impose a substantial obstacle to replenishing the supply of ice, as the latter is depleted due to sublimation. For example, the successively lower compartments of the basket, as delineated by the cruciforms, may contain inadequate charges of ice due to sublimation loss, which charges remain spaced apart due to the presence of cruciforms. Thus, while access may be had to the upper, open end of the ice basket for recharging the first and possibly the second upper compartments, the lower compartments are inaccessible, yet may contain an inadequate charge of ice due to sublimation voids. The ice basket thus loses its required cooling capability, presenting a potentially serious deficiency.

Known methods and related apparatus for replenishing sublimated ice voids in the ice baskets all effectively require the complete removal of all remaining ice and the cruciforms, as well, before the compartments may be successively reloaded with new charges of ice and replacement cruciforms installed, to the required capacity of the entire basket. There thus exists a significant requirement, for which no solution has appeared heretofore, of satisfying this critical maintenance operation without having to remove remaining ice or existing cruciforms.

SUMMARY OF THE INVENTION

The present invention affords a maintenance screw drill/conveyor tool, and related method of operation, for maintaining ice beds of ice condenser containments, in accordance with which an axially extending hole is drilled longitudinally down through the ice condenser containment, or basket, typically to a depth of from 42 feet to 43 feet from the open, upper end of the basket (i.e., for a typical basket of a height of 48 feet). The tool is then selectively operated to feed ice downwardly through the drilled hole and into the voids, while gradually being retracted, or withdrawn, from the hole as the voids are filled, from the lowermost to the uppermost compartment of the basket.

In more detail, each ice basket initially is weighed to determine the net weight, or content of the borated ice therein and thus establish whether the ice content thereof must be replenished. Suitable equipment for accomplishing that weighing function is disclosed in the copending application, entitled "COMPACT ICE BASKET WEIGHING TOOL," of which the coinventors herein are among the coinventors thereof and which application is assigned to the common assignee hereof. Once an ice basket is identified as requiring replenishment of the ice, it is isolated and enclosed by installing and inflating elongated plastic inflatable bags about the exterior surface of, and between, the selected ice basket and those of adjacent rows and columns, to prevent spillage of the ice out of the holes in the sidewalls of the ice basket. This isolation technique is a part of the ice loading procedure as typically is employed both in initial charging of ice and subsequent replenishment of ice, in accordance with known procedures.

The screw drill/conveyor tool of the present invention includes a support frame which is mounted on the lattice frame surrounding a selected ice basket and locked in place thereon. A drill is mounted for selectively controlled, vertically reciprocating movement relative to a support frame by an electrically driven winch which selectively raises and lowers the drill in a vertical direction. An auger shaft of plural sections interconnects the drill and a rotary bit. Initially, the winch raises the drill to its uppermost position and a first auger shaft section is connected to the drill at its upper end and to a rotary bit at its other end. The drill is turned on and the auger and bit rotated thereby and the winch turned on to permit the drill to progress downwardly in a parallel axial relationship within the ice basket, until approximately one foot of the upper end of the shaft section remains above the top of the ice basket. A clamping device pivotally mounted on the support frame then is rotated into position to capture the protruding end of the drill shaft section to prevent it from dropping into the ice basket. The drill then is disconnected and raised by the winch to the uppermost position of its travel in the support frame. A subsequent drill shaft section then is coupled to the first, and connected to the drill. The operation then is repeated until the coupled drill shaft sections have advanced the bit to the aforementioned desired depth, typically some 42 feet to 43 feet below the top of the basket.

At the conclusion of the drilling operation, a final shaft section is coupled in place, so as to dispose the electrically driven drill at the uppermost travel position relative to the platform and as controlled by the winch. The clamping device then is disengaged to release the drill shaft section, and a funnel pivotally mounted on the frame is rotated into position adjacent the protruding drill shaft section. The winch motor is maintained in an off condition, thereby locking the drill and the coupled shaft sections at the established elevation. The drill then is switched to rotate in a reverse direction and granular ice chips or flakes are fed into the funnel. By virtue of a continuous, helical spiral fin on the auger shaft sections, the reverse rotation thereof pulls the loose ice downwardly through the drilled hole and fills the lowermost, and the successive, next higher voids. As the voids become full, the ice compacts about the rotating drill shaft section, as evidenced by a tendency of the rotational speed of the drill to decrease and of the auger to attempt to back out of the ice basket. When these conditions are observed, further ice conveying operations are halted and one or more drill shaft sections are removed, by a reverse sequence of the drilling operation, and then the ice feeding, or conveying, operation is repeated. These operations continue until the successive compartments of the ice basket are filled.

Upon completion of filling a given ice basket, the plastic blowout bags are deflated and removed and the ice basket is lifted and weighed to verify the new weight and confirm that it satisfies the requisite content of ice. If not, the foregoing procedures are repeated for that ice basket. If the measured weight confirms the adequacy of the ice replenishing operations, the operations are performed for a next successive ice basket.

Accordingly, the screw drill/conveyor tool and maintenance method in accordance with the present invention overcomes significant limitations of prior art mechanisms and procedures, greatly facilitating the important maintenance function of replenishing sublimation voids in ice baskets employed with the nuclear reactor systems. These and other advantages of the apparatus and method of the present invention will be more apparent from the following drawings and detailed description.

BRIEF DESCRIPTION OF THE DRAWINGS

FIGS. 6 and 7 are side and end elevational views, respectively, of a drill bit which is coupled to an auger-drill shaft section having a continuous helical spiral fin thereabout, employed for both drilling and ice bed replenishment operations.

DETAILED DESCRIPTION OF THE PREFERRED EMBODIMENT

Figure 1:
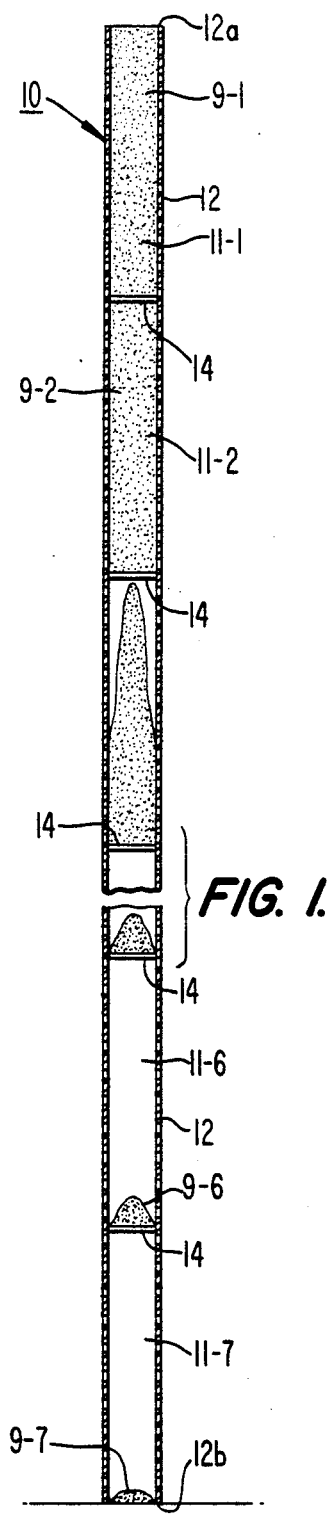
FIG. 1 is an elevational view, in cross-section, of an ice basket having cruciforms at spaced elevations defining a corresponding succession of ice holding compartments.

FIG. 1 is an elevational view, in cross-section, of an ice basket 10 having a cylindrical, perforated metal sidewall and divided into a series of compartments, delineated by cruciforms 14. In a typical installation, the cruciforms 14 are disposed at axially displaced positions, or elevations, spaced apart by approximately six foot intervals within the basket 10, and define a succession of seven compartments 11-1 through 11-7, each containing initially a full charge of ice. The cruciforms 14 may be of the conventional X-shaped configuration having radially extending legs, the inner limits of the legs typically being welded in a common joint or juncture and the outer edges of the legs being welded directly to the retaining rings of the ice basket 12, at the corresponding elevations. The radial legs of each such conventional X-shaped cruciform thus defines quadrant areas at each elevational cross-section of the ice basket 12. The open, upper end 12a of ice basket 10 affords limited access to the interior of the basket 10, the lower end 12b typically being enclosed by a grating or mesh-like end closure (not shown) which is contiguous with support structure (not shown) for the basket 10.

The cruciforms 14 support the charges of ice within the corresponding compartments, despite the fact that sublimation has resulted in reduced charges of ice existing within the lower compartments. For example, whereas the charges of ice 9-1 and 9-2 substantially fill the corresponding compartments 11-1 and 11-2, in the lowermost compartments 11-6 and 11-7, significantly depleted charges of ice 9-6 and 9-7, respectively, remain. Whereas removal of the charge of ice at the uppermost compartment 11-1 is feasible with conventional tools since accessible through the open upper end 12a, removal of ice from the successively lower compartments is a difficult task.

Figure 2:
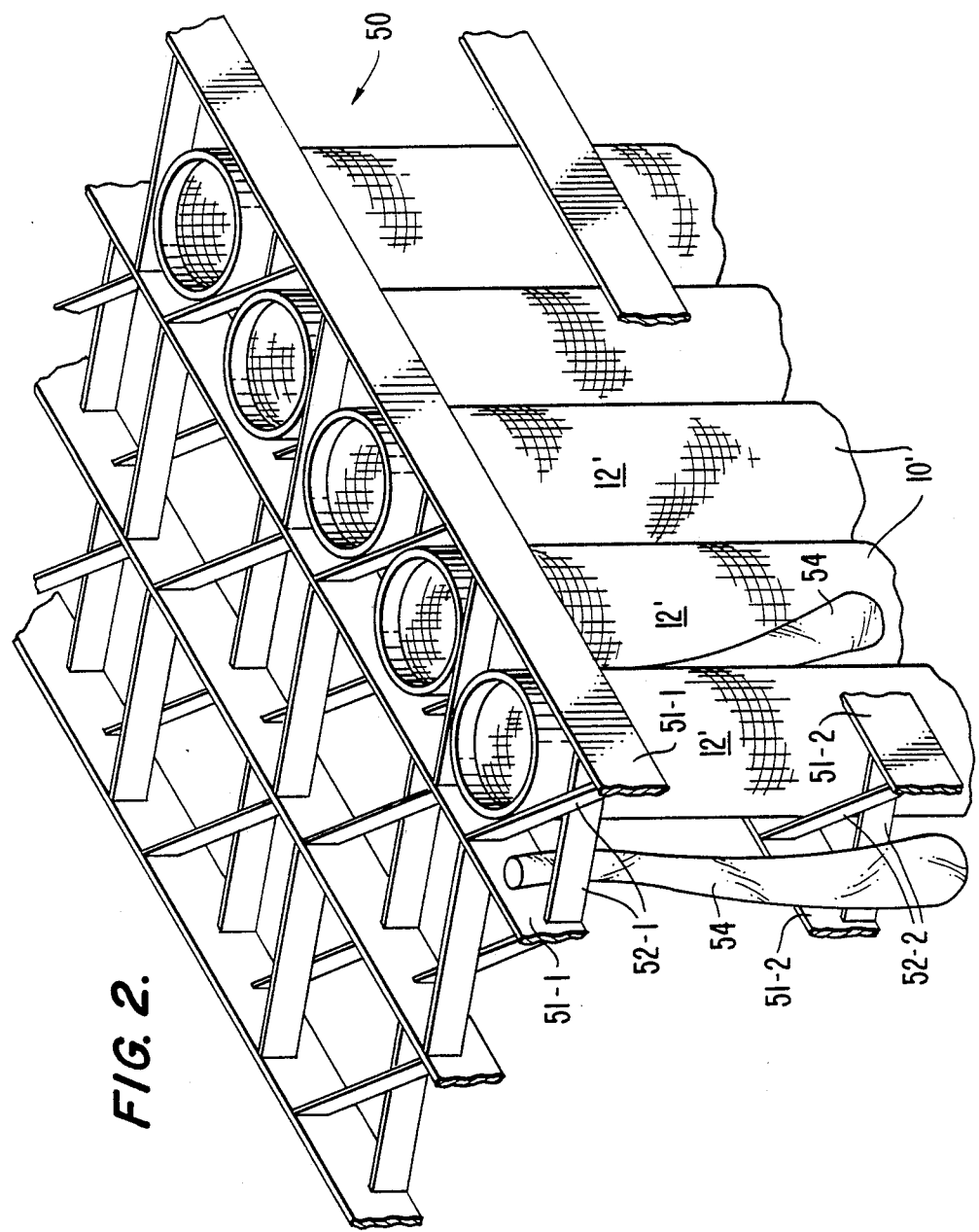
FIG. 2 is a perspective, simplified and schematic view of an array of ice baskets and the lattice support frame thereof.

FIG. 2 is a simplified, perspective view of a typical arrangement of ice baskets as hereinbefore described and identified therein at 10', illustrating the perforated cylindrical sidewall 12' of each and showing the lattice support frame 50. The frame 50 includes at each of plural, spaced elevations, parallel extending support beams, shown at two illustrative such elevations by the beams 51-1, 51-1, . . . 51-2, 51-2, . . . . Further, extending between each of the parallel beams 5' and directly engaging the sidewalls of the individual ice baskets 14' are corresponding pairs of criss-cross or X-shaped lateral basket supports 52-1, 52-2.

As a first step in the maintenance method of the present invention, the individual ice baskets 14 are weighed to determine the presence of sublimated voids and thus to identify baskets requiring maintenance. The weighing may be performed in accordance with the apparatus employed in the above referenced application entitled "COMPACT ICE BASKET WEIGHING TOOL," incorporated herein by reference. Plastic inflatible bags, schematically illustrated at 54, are inserted in surrounding relationship with respect to an ice basket 10 identified as requiring maintenance, and are inflated so as to surround and isolate the basket and prevent ice spillage out of the holes in the sidewalls of the ice basket. The uppermost level of support beams 51-1 defines a deck area on which a support frame for the tool of the invention is received, as now described, with reference to FIGS. 3–7 hereof.

Figure 3:
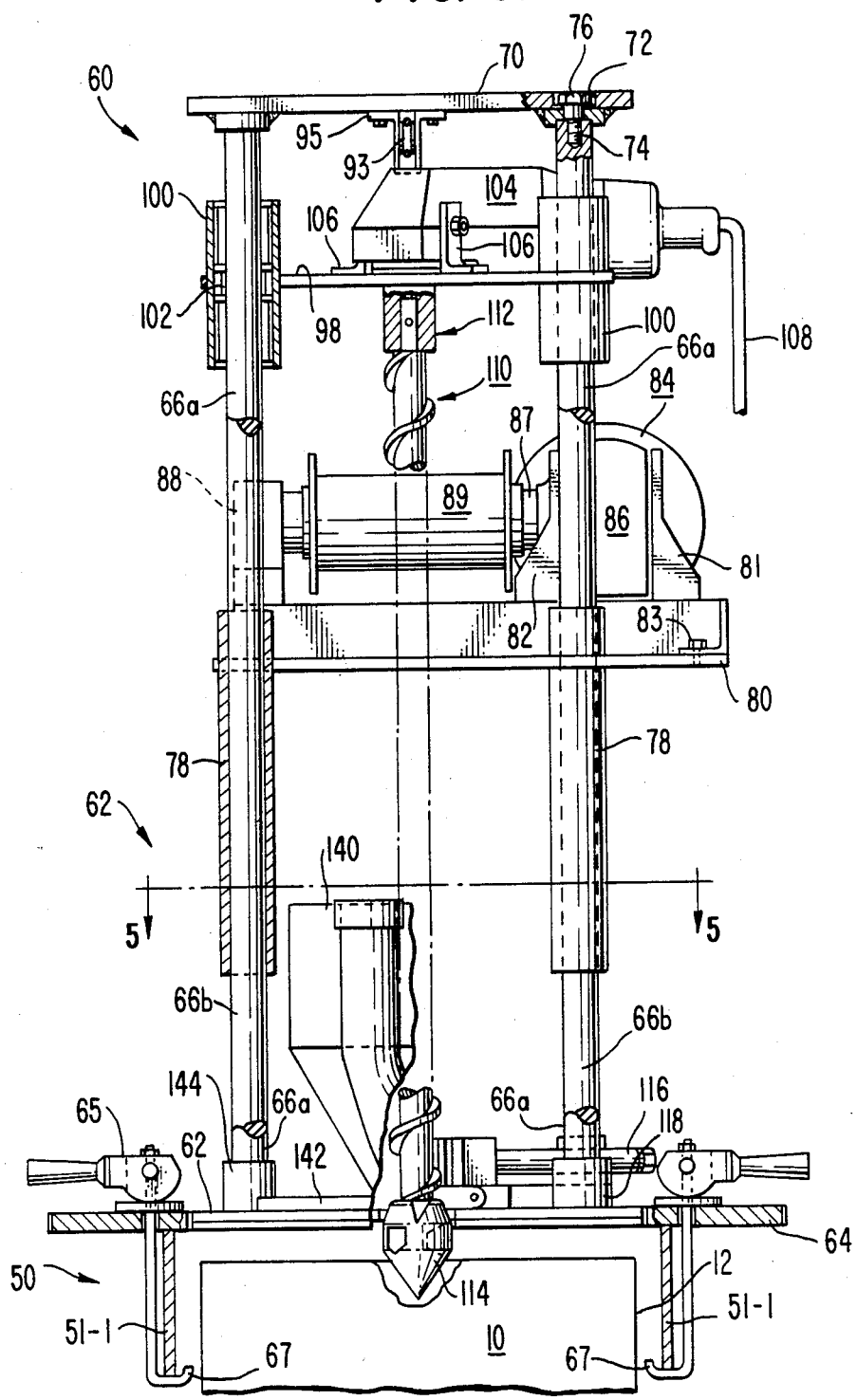
FIG. 3 is an elevational view of the maintenance screw drill/conveyor tool in accordance with the present invention.
Figure 4:
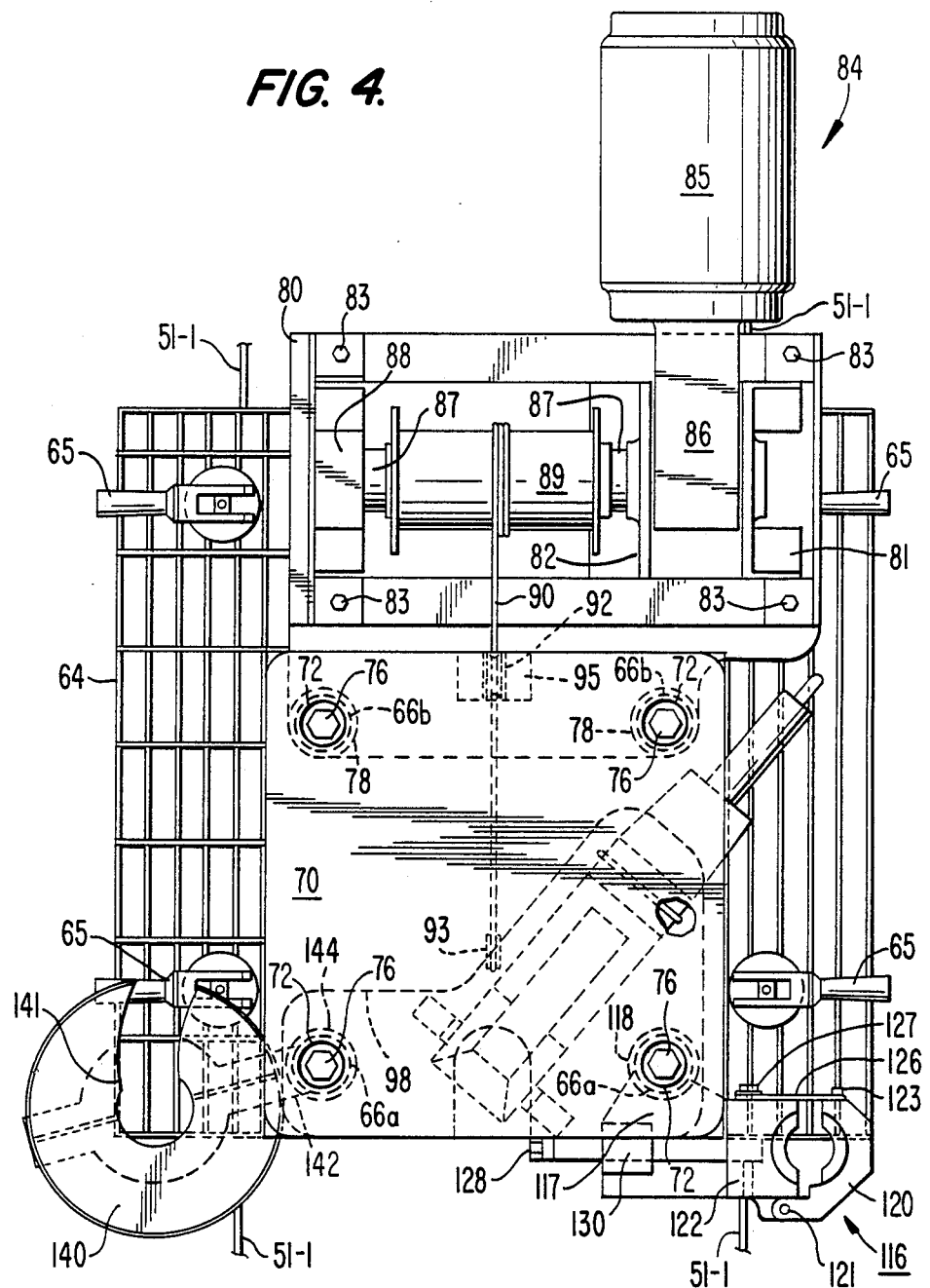
FIG. 4 is a top plan view of the tool of FIG. 3.

FIGS. 3 and 4 comprise, respectively, an elevational view and a top plan view, of the maintenance screw drill/conveyor tool 60 of the present invention. The tool 60 comprises a support frame 62 which is positioned on the upper edges of the lattice frame support beams 51-1, spanning the open, upper end of a selected ice basket 12. The support frame 62 includes a base platform 64 and four vertically oriented support rods, or shafts comprising a front pair 66a and a rear pair 66b (shown in partially broken-away form in FIG. 3) secured at their lower ends to the platform 64 and interconnected to each other at their upper ends by a top support plate 70, the latter having suitable holes 72 therein aligned with threaded bores 74 in the upper ends of the rods 66a and 66b for receiving screws 76. Double cam locks 65 include hooked arms 67 which hook around the lattice frame support beams 51-1 in FIG. 2 and secure the tool 60 in position.

A support shelf 80 is mounted at a fixed position by collars 78 on the rear pair of support rods 66b, as viewed in FIG. 3. An electrically powered winch 84 including a motor 85 and gear box 86 is mounted on the platform 80 by brackets 81 and 82, the latter secured to the platform 80 by bolts 83. Shaft 87 is driven from the gear box 86 and its free end is supported in a bearing housing 88, likewise secured to the platform 80 by bolts 83, and carries a spool 89 thereon about which a wire rope 90 is wound. The wire rope 90 is received over pulleys 92 and 93 affixed by brackets 95 to the underside of the top support plate 70. The wire rope 90 extends vertically downwardly from the pulley 93 and is secured to a movable support plate 98 which is mounted on collars 100 having internal bearings 102 for axial, or vertically reciprocating sliding movement on the front pair of support rods 66. A right-angle reversible drill 104 is secured by a pair of brackets 106 to the movable support plate 98 and connected through a power cord 108 to a source of AC power. An auger shaft section 110 is coupled to the drill 104 by a conventional coupling 112 and extends axially downwardly therefrom, parallel to the support rods 66a, and carries a rotary bit 114 on the lowermost end thereof.

Figure 5:
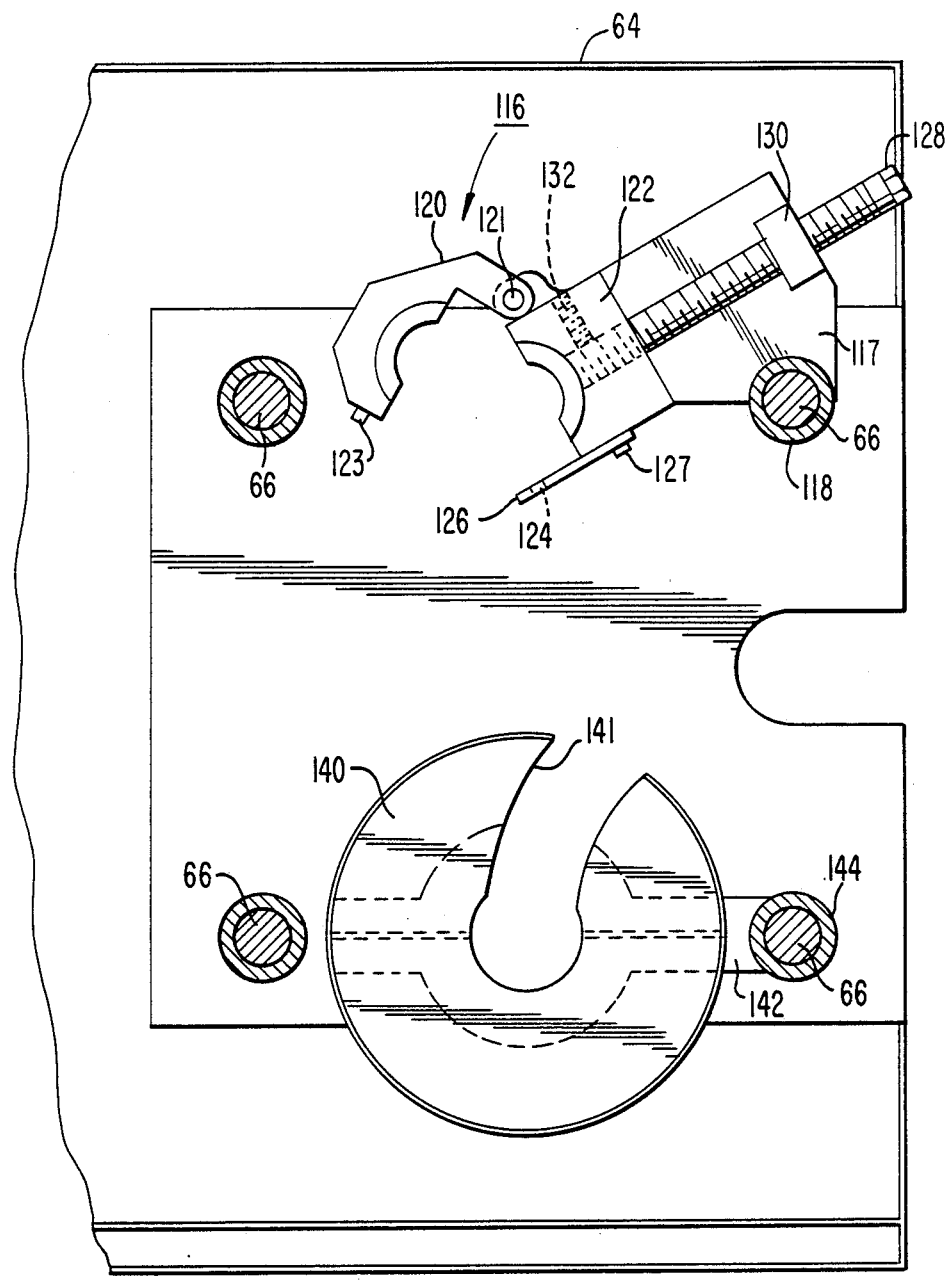
FIG. 5 is a simplified plan view of the tool, taken effectively in cross-section along the line 5—5 in FIG. 3, several parts being removed for clarity of illustration.

A clamping device, or gripper, 116 is shown in FIG. 4 in its displaced position relative to the auger 110 and, in FIG. 5, as rotated into position for engaging the auger 110. The gripper 116 is mounted by a bracket 117 and rotary bearing mount 118 on the right front support rod 66a, as seen in FIG. 3, for being rotated between the inoperative and operative positions above noted. A pair of jaws 120, 122 are pivotally connected as shown at 121, the fixed jaw 122 being secured to the plate 117. In the closed or engaged position as shown in FIG. 4, the pivotal jaw 120 is positioned in surrounding relationship with the auger 110 and clamped thereabout, pin 123 being received through a corresponding aperture 124 in the spring lock bar 126, the latter being secured to the fixed jaw 122 by a screw 127. The jaws 120, 122 may be adjusted in position by a long bolt 128 which is threaded through a mounting block 130 and which is rotatably connected at its free end within the fixed jaw 122 by a set screw 132. When not in use, the gripper or clamping device 116 is rotated away from the auger so as to permit drilling operations to proceed, as seen in FIG. 4.

A funnel 140 is mounted by bracket 142 to a bushing 144 for rotatable positioning relative to the left front support rod 66a, permitting same to be rotated to the inoperative position shown in FIG. 4 or, in a clockwise direction from that inoperative position of FIG. 4, to an operative position as shown in FIG. 3 in which the funnel 140 is essentially coaxial with the auger 110, the channel 141 in the sidewall of the funnel 140 receiving the lower portion of an auger section 111 therein.

As will be apparent, FIG. 4 has been simplified for clarity of illustration as to the structures associated with the support rods 66a and 66b and shown in phantom lines therein; specifically, only bushing 144 and bearing mount 118 are shown with the associated left and right front rods 66a, and only the collars 78 are shown with the associated pair of rear support rods 66b in phantom lines.

FIGS. 6 and 7 are side and end elevational views of a section 111 of the auger 110, illustrating as well the drill bit 114. As before noted, a continuous helical fin 113 is formed on the auger 110. The auger section 111 includes a bore 111a at its lower end for receiving the shank 114a of the bit 114, a pin 115a locking the two together. The opposite end of the auger section 111 includes a shank 111b and a spring loaded pin 115b adapted for being received in and locked to the corresponding bore 111a of a successive auger shaft section 111.

In operation, the platform 64 is secured to the lattice frame 50, the drill 104 is energized to rotate the auger shaft 110 and the bit 114 to drill an axial hole through the ice within the basket 112 is located over the open end 12a of the ice basket 10 with the bit 114 and auguer shaft 110 positioned over one of the quadrants defined by the cruciforms. In practice, the bit 114 and auger shaft 110 preferably are positioned near the inside of the sidewall 12, since the bit 114 has a tendency to walk, or travel, over to the inside of the wall 12 and follow the wall 12 down the height of the basket 10. The ice which is cut by the bit 114 is exhausted from the ever-deepening hole by the auger fin 113. As the drilling proceeds, winch 84 is operated at a speed, coordinated with the speed of drilling, to permit the movable support plate 98 to descend; the drilling is continued until each topmost auger section has progressed into the ice, leaving only approximately one foot of the upper end exposed above the ice. The drill 104 and the winch 84 then are stopped and the clamping device or gripper 116 is rotated in place for clamping the auger 110. The drill 104 then is disconnected at coupling 112 and the winch 84 is operated to raise drill 104 to the topmost position of its travel, and a successive auger section 111 coupled in place. The clamping device 116 then is rotated out of position and the drilling then continues.

Once a hole is drilled through the ice basket to the desired depth, typically 42 feet to 43 feet from the top, the drill 104 is again raised to its uppermost position under control of the winch 84, the necessary additional section 111 of the auger 110 being added, as before described. The funnel 140 then is rotated into position, the open slot 141 in the side of the funnel receiving therein the corresponding portion of the auger shaft section 111. The drill 104 then is switched to the reverse direction of rotation and turned on, while the winch motor 84 is left in the "OFF" position thereby to lock the auger 110 at its current elevation and prevent same from backing out of the ice basket 12. Ice in particulate form, such as granular ice chips or flakes, then is fed into the funnel 124 and pulled down into the ice basket 12 through the drilled hole by the reverse rotating auger 110.

It has been demonstrated experimentally that such ice chips or flakes readily flow down through the drilled hole, as fed or conveyed by the rotating auger 110, and fill the voids within the successive chambers. As the level within each chamber fills, the ice begins to compact against the auger, slowing the rotational speed of the drill 104, and causing the auger 110 to attempt to back out of the basket 12. This condition is sensed by the operator and the tool 60 then is operated in the reverse sequence from the drilling operation, to remove an auger section 111, as before described, and thereby raise the auger 110 to permit the ice filling operation to continue, section by section. When the auger has been retracted fully from within the basket, the basket is weighed to determine if the required complement of ice is present. If the required amount of ice is present, the bags 54 are deflated and moved, along with the tool 60, to a further ice basket 10 requiring replenishment of the ice. If not, the operation may be repeated, typically proceeding down a different quadrant of the internal configuration of the ice basket as defined by the prior art type of cruciforms.

The tool of the invention thus affords a highly effective and efficient technique for filling sublimation voids, in the charges of ice within ice baskets as are employed in nuclear power generating systems, and significantly, eliminates the requirement of known apparatus and methods for complete removal of all remaining quantities of the prior ice charges before reloading the baskets with new ice.

Numerous modifications and adaptations of the present invention will be apparent to those of skill in the art and thus it is intended by the appended claims to cover all such modifications and adaptations as fall within the true spirit and scope of the present invention.

We claim as our invention:

1. A tool for replenishing sublimated ice charges within an individual ice basket of a plurality thereof associated with a nuclear reactor system, comprising:
    a frame adapted to be supported over a selected ice basket;
    support means mounted for reciprocating, vertical movement with respect to said frame through a path of travel between upper and lower positions and in parallel axial relationship to an ice basket when supported thereon;
    rotary drive means mounted on said support means;
    means for selectively moving said support means and said rotary drive means through the path of travel;
    a rotary drill bit;
    an auger of plural, selectively connectable elongated sections, each said section being of a length approximately equal to the length of the path of travel between the upper and lower positions, and said plural auger sections being connectable in succession between said rotary drill bit and said rotary drive means, for being driven in rotation by said rotary drive means and correspondingly driving said rotary drill bit in rotation, said auger defining a continuous helical fin about the surface of each said section thereof, and of said plural sections thereof when selectively connected together;
    said selective moving means selectively moving said support means and said rotary drive means downwardly through the path of travel to the lower position while said rotary drive means drives said auger and associated drill bit in rotation, for drilling a hole through the ice within a selected ice basket, and upwardly through the path of travel to the upper position for selectively and respectively connecting and disconnecting successive auger sections between the drill bit and the rotary drive means;
    means for supplying ice in particulate form to said auger; and
    said selective moving means maintaining said rotary drive means at a fixed vertical position in the path of travel and said rotary drive means driving said auger and bit in a reverse direction for conveying ice supplied to said auger through the drilled hole to fill the lowermost and successively higher sublimation voids in the ice.

2. A tool as recited in claim 1, wherein there is further provided:
    clamping means connected to said frame and movable from a rest position to an engaged position for engaging a portion of an auger section protruding above the ice and adjacent the top of the ice basket, and retaining same against axial displacement during selective connection and disconnection thereof to and from said rotary drive means.

3. A tool as recited in claim 1, wherein said ice supplying means comprises a funnel connected to said frame and movable from a rest position for selective positioning in association with said auger, for supplying ice to said auger for conveying same thereby through the drilled hole.

4. A tool as recited in claim 1, wherein said selective moving means comprises:
    a winch mounted in fixed relationship to said frame and connected through a wire rope and pulley to said support means on which said rotary drive means is mounted.

5. A tool as recited in claim 1, wherein said rotary drive means comprises a reversible, electrical drill.

6. A tool for replenishing sublimated ice charges within individual ice baskets, of an array of plural such ice baskets associated with a nuclear reactor system and maintained in generally vertically oriented and parallel relationship by a lattice support structure which extends between the individual ice baskets and includes lateral supports adjacent the tops of the individual ice baskets, comprising:

a frame comprising a lateral platform and vertical support elements secured thereto and extending upwardly therefrom;

means for securing said lateral platform of said frame to the lattice support structure with the tool positioned over a selected ice basket;

a support plate mounted on said vertical support elements for vertical movement through a path of travel between upper and lower positions;

rotary drive means mounted on said support plate;

a rotary drill bit;

an auger of plural, selectively connectable elongated sections, said auger sections being connectable in succession between said rotary drill bit and said rotary drive means, for being driven in rotation thereby and correspondingly driving said rotary drill bit in rotation, said auger defining a continuous helical fin about the surface of each said section thereof, and of said plural sections thereof when selectively connected together;

means for selectively moving said support plate vertically downwardly through the path of travel to the lower position while said rotary drive means drives said auger and associated drill bit in rotation, for drilling a hole through the ice within a selected ice basket, and upwardly to the upper position of the path of travel for selectively connecting and disconnecting a successive auger section between the drill bit and the rotary drive means; and means for supplying ice to an upper, exposed end of said auger while positioned in a hole drilled into the ice thereby, said selective moving means maintaining said support plate at a fixed vertical position in said path of travel, and said rotary drive means rotating the auger and bit in a reverse direction, for conveying ice through the drilled hole to lowermost and successively higher portions of said ice basket associated with the hole, for correspondingly filling sublimation voids in the ice.

7. A tool as recited in claim 6, wherein there is further provided:

clamping means connected to said frame and movable from a rest position to an engaged position for engaging a portion of an auger section protruding above the ice and adjacent the top of the ice basket, and retaining same against axial displacement during selective and respective connection and disconnection of successive auger sections between the drive means and a next successive auger section.

8. A tool as recited in claim 6, wherein said supplying means comprises a funnel connected to said frame and movable from a rest position for selective positioning in association with said auger, for supplying ice to said auger for conveying same thereby through the drilled hole.

9. A tool as recited in claim 6, wherein said selective vertical moving means comprises:

a fixed plate supported to said vertical support elements; and a winch mounted on said fixed support plate and connected through a wire rope and pulley to said support plate on which said rotary drive means is mounted.

10. A tool as recited in claim 6, wherein said rotary drive means comprises a reversible, electrical drill.

11. A tool as recited in claim 6, wherein said vertical support elements comprise cylindrical rods affixed to and extending upwardly from said support plate, in parallel axial relationship.

* * * * *